Sept. 22, 1964   O. L. POLLY ETAL   3,150,346
UNDERWATER TRANSDUCER
Filed Jan. 9, 1961                    3 Sheets-Sheet 1

INVENTORS.
ORVILLE L. POLLY
CHARLES J. LINK
LAWRENCE A. PYATT
BERNARD FARMEN
BY
Gene W. Arant
ATTORNEY

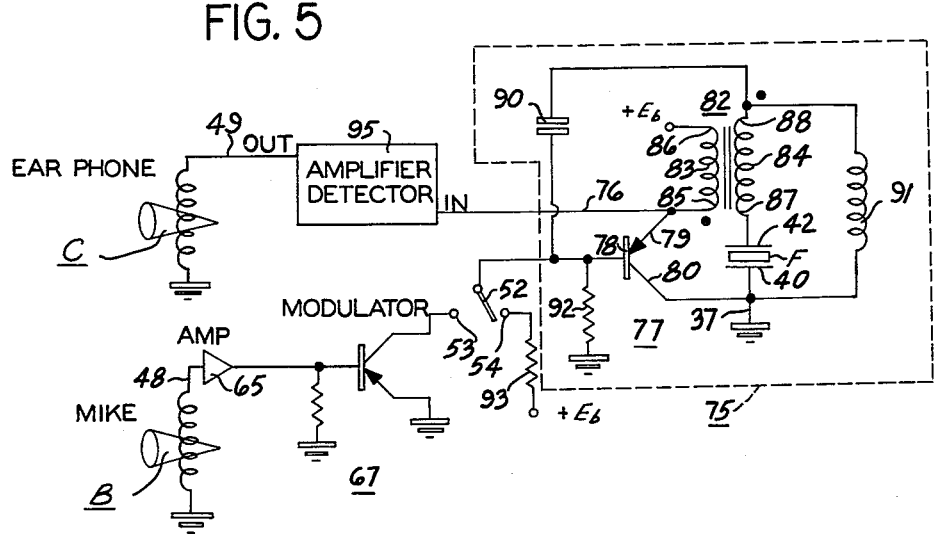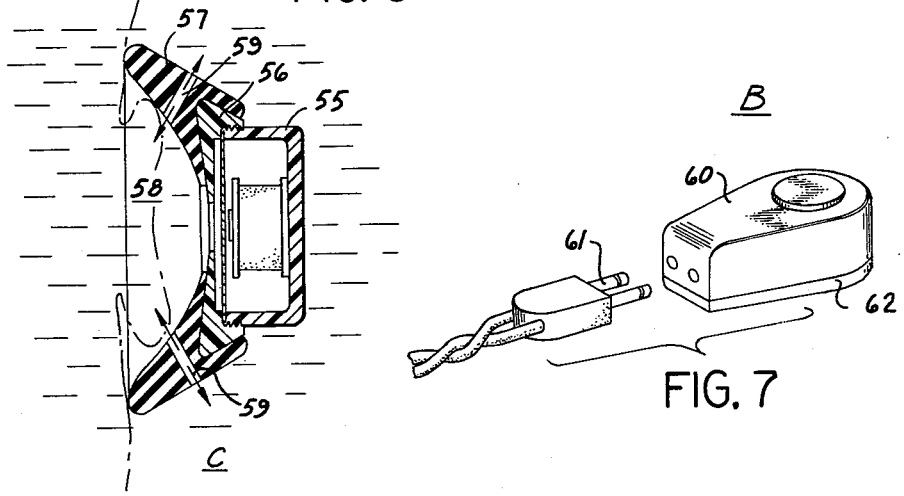

Sept. 22, 1964 O. L. POLLY ETAL 3,150,346
UNDERWATER TRANSDUCER
Filed Jan. 9, 1961 3 Sheets-Sheet 3

INVENTORS.
ORVILLE L. POLLY
CHARLES J. LINK
LAWRENCE A. PYATT
BERNARD FARMEN
BY Gene W. Arant
ATTORNEY

United States Patent Office 3,150,346
Patented Sept. 22, 1964

3,150,346
UNDERWATER TRANSDUCER
Orville L. Polly, 2701 Oregon Ave., Long Beach, Calif.;
Charles J. Link, 1532 Summit St., Long Beach 10,
Calif.; Larry A. Pyatt, 6202 Indiana Ave., Buena Park,
Calif.; and Bernard Farmen, 3323 Lime Ave., Long
Beach 7, Calif.
Filed Jan. 9, 1961, Ser. No. 81,650
7 Claims. (Cl. 340—8)

The present invention relates to an underwater transducer having a novel structural configuration.

One object of the invention is to provide an underwater transducer in which the radiating element projects entirely outside the housing in which the other operative elements of the device are contained.

Another object of the invention is to provide an underwater transducer in which the response of the radiating element is modified by an artificial mechanical loading.

A further object of the invention is to provide an underwater transducer in which the radiating element is mechanically loaded in such a manner as to inhibit secondary modes of vibration thereof.

Yet a further object of the invention is to provide underwater communication apparatus which is rugged, compact, cheap to manufacture, and easy to use and maintain.

The underwater transducer of the present invention is, for convenience, illustrated and described herein as a part of a complete underwater communication system adapted for use by a diver, which communication system operates on a fixed carrier frequency which is modulated with the intelligence signal to be transmitted.

The above and other objects and advantages of the invention will be more readily understood from the following description considered in conjunction with the accompanying drawings, in which:

FIGURE 5 is a schematic wiring diagram of the electric circuit contained within the box or housing of the invention;

FIGURE 6 is a cross-sectional view of the earphone of FIGURE 1;

FIGURE 7 is a perspective view of the microphone of FIGURE 1;

According to the invention a watertight box or housing is provided which is adapted to be supported upon the diver's chest, and which includes a flat panel forming an exposed outer wall thereof. This exposed panel is used as an acoustical radiator or receiving element, depending upon whether messages are being transmitted or received. An electro-acoustic transducer is provided within the housing which is mechanically coupled to the flat panel. In addition, the housing contains electrical circuits for generating in electrical form the signals which are to be transmitted, or for producing the electrical equivalent of the received acoustic signals. The housing may conveniently be supported on the diver's chest by suspending it from the same harness that is used for carrying the compressed air tank on the diver's back. A switch is externally supported on the housing and is conveniently accessible by either hand of the diver for switching the set from the transmit to the receive condition, or vice versa.

The invention also utilizes a throat microphone which is carried in contact with the diver's throat, and a separate earphone which is preferably carried in surface contact with the bony area behind one ear. These compact devices are permanently supported in their respective positions without any inconvenience to the diver and without interfering with any of his other equipment.

An important feature of the invention is the use of an ultrasonic carrier for transmitting messages through the water. One advantage of the carrier is that it eliminates low frequency noises of the underwater environment. The use of the carrier also permits the relatively small radiating element, compact enough to be conveniently carried on the diver's chest, to nevertheless span several wave lengths of the transmitted or received frequency and to therefore provide a relatively directionalized propagation or receiving area.

Of considerable significance in the successful use of the invention is the fact that the diver can very easily identify the person or persons with whom he is conversing. The beam of radiated energy travels forward from the diver's chest with an angular width both in the vertical and horizontal directions which is of the order of magnitude of 90 degrees. Or, when the set is in the receive condition, signals are received from the same area in front of the diver's chest. Thus the area in which the diver is able to communicate with other divers coincides approximately with the area of his vision. The use of hand signals in conjunction with the speech transmission therefore makes it very easy for the diver to identify the person or persons with whom he is able to converse.

Figure 1:
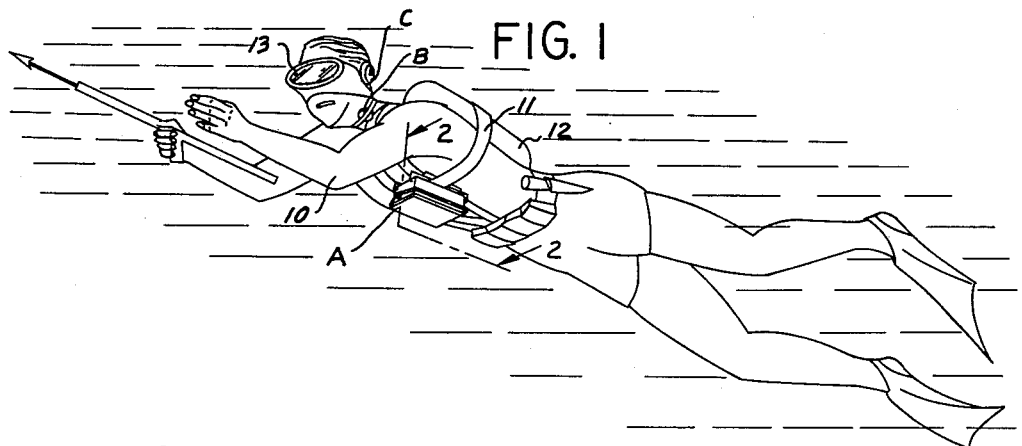
FIGURE 1 is a perspective view of a diver equipped with the communication aid of the present invention.

Referring now to the drawings and more particularly to FIGURE 1 thereof, a diver 10 is shown wearing a harness 11 by means of which an air tank 12 is carried on his back. A mask 13 is shown covering his eyes. A mouth piece and hose assembly normally used in conjunction with the air tank 12 has been omitted in this instance in order to permit the more clear illustration of the invention. Housing A in accordance with the invention is carried on the diver's chest, being supported from the harness 11. A throat microphone B is carried in contact with the diver's throat, and an earphone C is on or near one of his ears.

Figures 2, 3:
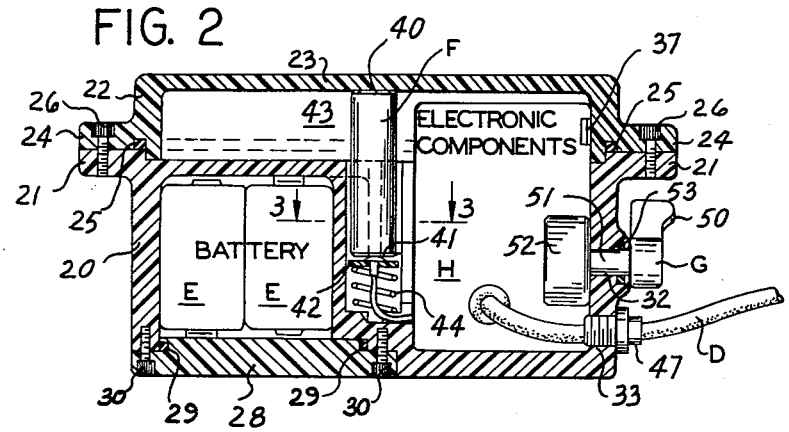
FIGURE 2 is a cross-sectional view of the box or housing of FIGURE 1 taken on the line 2—2 thereof.
FIGURE 3 is a partial cross-sectional view of the box or housing of FIGURE 2 taken on the line 3—3 thereof.

Reference is now made to FIGURES 2 and 3 where housing A and associated apparatus are illustrated in more detail. A cable D communicates between the interior and exterior of housing A, and although not shown in FIGURE 1, is mechanically and electrically connected both to throat microphone B and earphone C. At least one removable battery E is carried within housing A as a source of energy. An electro-acoustical transducer F is also carried within housing A. Switch means G which is partly external and partly internal to the housing, and electrical circuits H carried within the housing, complete the major components of the system.

The mechanical construction of housing A will now be briefly described. A rectangular dish 20 has a horizontally outwardly extending flange 21 surrounding its upper edge. Lid 22 includes an upper flat panel 23 as well as a flange 24 surrounding its lower periphery. Flanges 21 and 24 mate together grasping a sealing ring 25 therebetween, and are maintained in watertight relationship by means of a set of peripherally spaced screws 26.

A removable panel 28 which forms a portion of the bottom of dish 20 permits convenient removal and replacement of batteries E. Removable panel 28 is sealed by a gasket 29 and held in place by screws 30. A side wall opening 32 receives switch means G, and another opening 33 receives a cable D, as will be subsequently described in more detail.

A cylindrical wall 35 centrally disposed within dish 20 is formed integrally therewith and extends upward from the bottom thereof, with the upper end of cylinder 35 opening a substantial distance below the flat panel 23. Transducer F is retained within the wall 35, as will be explained. The lower part of housing A consisting of dish 20 is made of plastic material while lid 22 as illustrated in FIGURE 2 is made of metal, preferably stainless steel.

Transducer F consists of an elongated rectangular crystal having flat ends. The crystal has an isotropic structure and is of a commercially available type whose composition is such as to provide a Curie point above 110° C., the principal ingredient being a metal titanate. The upper flat end 40 of crystal F is bonded to the under surface of metallic panel 23 at the approximate center thereof. The lower flat end 41 of crystal F vibrates up and down within the cylinder 35, and is supported upon a flat electrode 42. The entire under surface of metallic panel 23 is free to vibrate since the upper end of crystal F is surrounded by air space 43. A helical spring 44 seated within the bottom portion of cylinder 35 supports the electrode 42 but at the same time permits the necessary vibration of the crystal and electrode to take place.

Where cable D enters opening 33 in housing A it is protected by a watertight fitting 47. Various types of such fittings are commercially available and details thereof need not be illustrated here.

Switch means G includes an external handle 50, a shaft 51 which passes through the opening 32, and an internal operative portion 52. A gasket 53 provides a watertight seal for the shaft 51. The electrical operation of switch portion 52 is illustrated in FIGURE 5.

Earphone C as shown in FIGURE 6 includes a sound generating device 55 one side of which threadedly engages a relatively rigid base member 56. Base member 56 in turn supports a concave, flexible reflecting member 57. Member 57 encompasses the diver's ear 58 which is shown in dotted lines. Member 57 contains a number of passageways 59 permitting free access of the surrounding water to the diver's ear so as to equalize the external pressure applied to the diver's ear with the internal pressure, regardless of the depth at which the diver is swimming.

Throat microphone B as shown in FIGURE 7 includes a mechanism 60 with which a diaphragm 62 is associated as the driving element. Electrical circuit plug 61 is connected to the mechanism 60 via suitable openings provided therein. Diaphragm 62 is placed in contact with the diver's throat, and actuates mechanism 60 for generating electrical signals which are transmitted via the plug 61 into the associated electrical circuit.

It will be recognized that throat microphone B and earphone C are both electro-acoustical transducers whose inherent characteristics are very similar. The microphone is used for converting acoustical vibrations to electrical vibrations while the earphone is used to accomplish the reverse process. Devices of this type are well known in the art and it is not necessary to describe or illustrate them in detail here. The small and compact device illustrated in FIGURE 7 has been found very satisfactory in actual usage, however, and in fact it is preferred to utilize two of these same devices, one for picking up speech signals from the diver's throat and the other for delivering speech signals by actual surface contact with the bony region behind the diver's ear.

Reference is now made to FIGURE 5 for a description of the electrical system utilized in the present invention. Microphone B is coupled through a conductor 48 to an amplifier 65 which is in turn coupled to a modulator stage 67. Modulator 67 is selectively coupled through switch portion 52 to an oscillator amplifier circuit 75. An output line 76 of the oscillator amplifier is connected to a receiving amplifier-detector 95, whose output signal is delivered by means of a conductor 49 to the earphone C. Amplifier-detector 95 is hereafter referred to simply as amplifier 95.

While microphone B and earphone C are each illustrated as having one terminal connected to ground it will be appreciated that in actual practice a pair of conductors are used. Thus, a conductor pair 48 and a conductor pair 49 are included within cable D for the purpose of making the necessary electrical connections external to housing A, while amplifier 65 and amplifier 95 are contained within housing A as a part of the electrical circuits H.

Oscillator amplifier circuit 75 includes a transistor 77 having a base 78, an emitter 79, and a collector 80. A step-up transformer 82 has a primary winding 83 and a secondary winding 84. One end 85 of primary winding 83 is connected to emitter 79, while the other end 86 of the primary winding is connected to the positive terminal of the battery power supply E, indicated as $+E_b$. One end 87 of the secondary winding 84 is connected to the electrode 42, while the other end 88 of the secondary winding is coupled through a capacitor 90 to the base 78. The polarity of the transformer windings is such that a signal impressed on end 85 of primary winding 83 is transferred to end 88 of secondary winding 84.

Collector 80 is connected to ground through a conductor 37, illustrated in FIGURE 2 as a ground terminal which conductively engages the inner wall surface of metal lid 22 of the housing A. The inner surface of metal panel 23 to which the upper end of crystal F is bonded at 40 therefore is also at ground potential, and together with the electrode 42, provides an effective electric coupling for driving the crystal F or for receiving an electrical output from crystal F when the latter is driven mechanically.

An inductance coil 91 is connected between upper end 88 of secondary winding 84 and ground. A bias resistor 92 is connected between base 78 of the transistor 77, and ground. Output line 76, which is coupled to the amplifier 95, is taken from emitter 79 of the transistor.

The internal portion 52 of switch means G consists of a switch blade having contacts 53 and 54 associated therewith. The blade engages contact 53 in one position, and contact 54 in another position. Switch blade 52 is connected to the base 78 of the transistor. Terminal 53 represents the output of modulator 67, while terminal 54 is connected through a bias resistor 93 to the positive terminal $+E_b$ of the power supply.

The operation of the circuit is as follows. When switch blade 52 engages contact 53 the output impedance of modulator 67 is then effectively in parallel with bias resistor 92, and the circuit values are such that oscillator 75 will then oscillate at an ultrasonic frequency. Speech signals picked up by microphone B are then transmitted from modulator 67 to base 78 of transistor 77, with the result that an amplitude-modulated carrier frequency is impressed upon the acoustic transducer F. At the same time, the speech signal is fed via lead 76 to amplifier 95 and may be monitored on the earphone C.

When switch blade 52 engages contact 54 a different bias potential is impressed on base 78 of transistor 77, which inhibits the circuit from oscillating. Acoustic vibrations externally induced in the panel 23 drive crystal F, sending a modulated carrier signal via capacitor 90 to the base 78 which is the signal input of transistor 77. A rectified output is produced on emitter 79 which is fed via lead 76 to the amplifier 95 and hence to the earphone C for producing an audio intelligence signal.

Circuit values which have been successfully used in actual practice for the circuit of FIGURE 5 are listed as follows:

| | |
|---|---|
| Modulator output impedance | 20K ohms. |
| Transistor | 30:1. |
| Transformer: ratio | DS–501 (or 2N278). |
|    Primary impedance | 3.5 ohms. |
|    Secondary impedance | 20K ohms. |
| Capacitor | 0.002 microfarads. |
| Resistor 92 | 100K ohms. |
| Inductor 91 | 5 millihenries. |
| Resistor 93 | 50 ohms. |
| Crystal F is ½ inch square and two (2) inches long. | |
| Oscillator frequency | 50 kc. |

While a P-N-P type transistor has been illustrated in conjunction with a power source providing a positive potential, it will be appreciated that an N-P-N transistor could be used equally well together with a power supply generating a negative potential.

The theory of operation of the oscillator circuit will now be briefly considered. The inductance coil 91, capacitor 90 and resistor 92 together constitute the tank circuit which stores oscillating energy and also determines the frequency. The operation is class C, in that the transistor 77 conducts during only one small portion of each operating cycle. During the major portion of each cycle the base 78 is biased below cut off. During conduction the transistor dissipates very little energy since the potential of the base 78 follows closely the potential of the emitter 79. The oscillator may therefore be characterized as an emitter-follower class C transistor oscillator.

Both the length and the width of panel 23 correspond to at least three wavelengths at the 50 kc. frequency. A directional propagation field is therefore provided, having an angular value of the order of 90 degrees.

Figure 4:
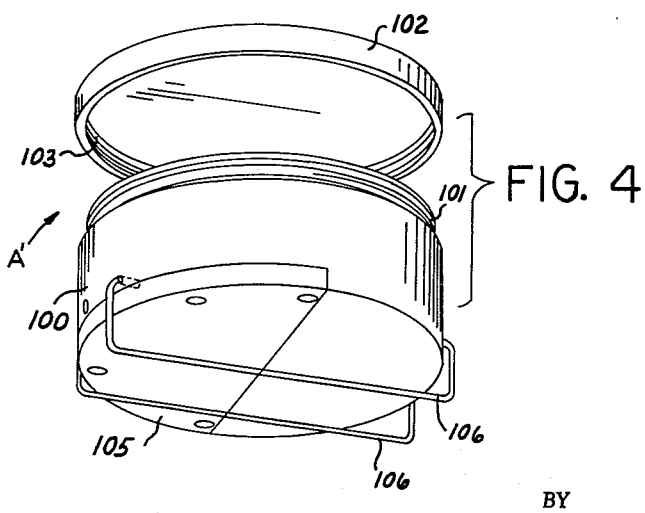
FIGURE 4 is an exploded perspective view of an alternate form of box or housing in accordance with the invention.

Reference is now made to FIGURE 4 illustrating an alternate form of housing A' in accordance with the invention. A cylindrical plastic dish 100 is provided with exterior threads 101 at its upper open end. A circular plastic lid 102 is provided with interior threads 103. Utilizing a conventional gasket, not shown, lid 102 may be screwed onto the top of dish 100 to provide a watertight housing. Additional features are a removable bottom panel 105, and a pair of hangers 106 which are adapted to engage the diver's harness 11.

Figure 8:
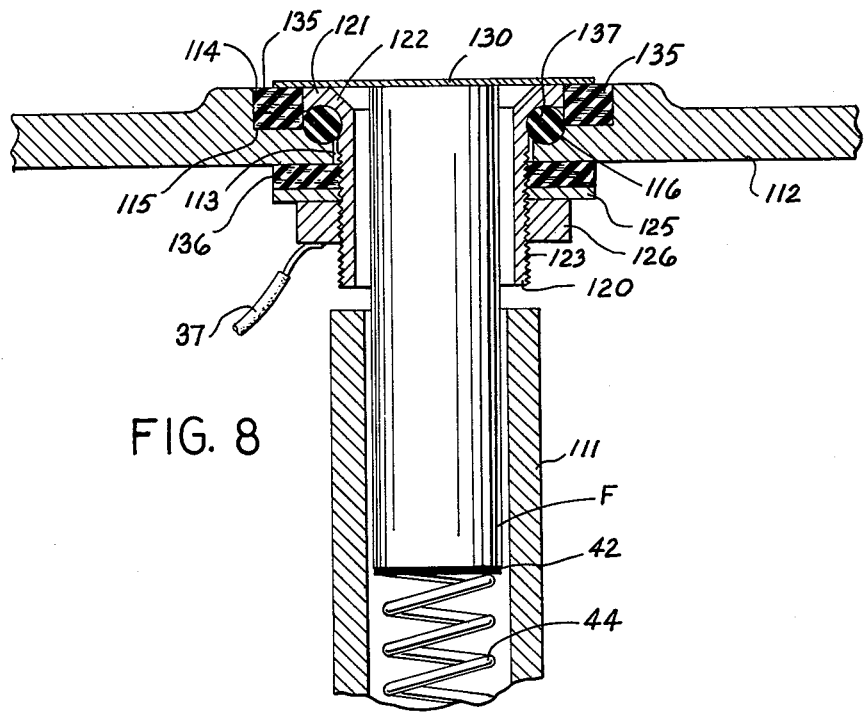
FIGURE 8 is a cross-sectional view of an alternate form of housing and radiating element.

Reference is now made to FIGURE 8 illustrating an alternate arrangement of housing and radiating element. The plastic dish 20 has a tubular portion 111 rising up to center of the bottom wall thereof. Support spring 44 and metal plate 42 are contained within the tubular portion 111, which also retains the lower end of crystal transducer F whose bottom end surface 41 rests upon plate 42.

A plastic lid 112 closes the upper end of housing A, lid 112 having a central opening 113 through which the upper end portion of crystal transducer F extends. The upper part of opening 113 is counterbored at 114 to provide a flat circumferential shoulder 115. At the juncture of central opening 113 and shoulder 115 a circumferential groove 116 is provided, which partially receives an O ring 137 made of rubber or other resilient sealing material.

A cylindrical metallic member 120 encloses the upper end portion of crystal transducer F and occupies the central opening in lid 112, while at the same time extending downwardly into housing A in aligned relationship with tubular portion 111. Member 120 rides up and down with any movement of the lid 112, however, hence the lower end of member 120 is spaced substantially above the upper end of tubular portion 111.

The upper end of cylindrical member 120 has an upwardly and outwardly extending circumferential flange 121 formed thereon, the under surface of which provides a circumferentially extending and transversely curved shoulder 122 which engages the O ring 137. The diameter of flange 121 is substantially identical to that of O ring 137, hence by means of the O ring the cylindrical member 120 is resiliently supported from lid 112.

An insulating washer 135 occupies the counterbored portion 114 of the central opening 113, resting upon the shoulder 115 and in relatively tight radial engagement with the flange 121 of member 120. Insulating washer 135 is of rectangular cross-section, and is preferably made of a combination rubber and cork material. A similar insulating washer 136 is circumdisposed about the midportion of member 121 and engages the under surface of lid 112 adjacent the central opening 113. The middle and lower end portions of member 120 are provided with an external thread 123. A lock nut 126 carried by threads 123 is tightened upwardly against a flat metal washer 125 to retain member 120 firmly in place, while at the same time maintaining compressive force upon O ring 137, insulating washer 136, and the intervening portion of lid 112.

In the arrangement shown in FIGURE 8 a flat circular metallic diaphragm 130 provides the radiating element. Diaphragm 130 is made of stainless steel having a thickness of 0.025 inch. The inner diameters of housing portion 111 and cylindrical member 120 are such as to provide working space surrounding the crystal transducer F. Diaphragm 130 is concentrically disposed to the upper end of transducer F with the flat under surface of the diaphragm being bonded, as by soldering, to the flat upper end surface 40 of the crystal transducer. Diaphragm 130 is of substantially greater diameter than the crystal F, and the outer circumferential edges of the diaphragm rest upon the upper flat surface of insulating washer 135. Electrical connection 37 is made to cylindrical member 120.

The outer diameter of insulating washer 135 is selected to be substantially greater than the diameter of diaphragm 130 while its inner diameter is selected to be substantially smaller. The under flat surface of diaphragm 130 around its entire circumference rests upon the insulating washer 135. The flange 121 of cylindrical member 120 is bonded, as by soldering to the under surface of diaphragm 130. When crystal transducer F vibrates longitudinally it moves the diaphragm 130 in direct accord with the crystal vibrations. Diaphragm 130 induces vibrations in the water which emanate substantially perpendicular to the flat outer surface of the diaphragm.

In the particular form shown in FIGURE 8 the diaphragm 130 has a diameter approximately twice that of the working face 41 of the crystal. The preferred range is from two to three times the crystal face diameter.

Figure 9:
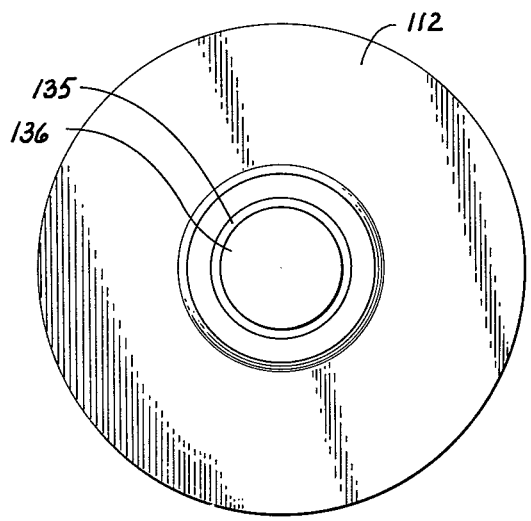
FIGURE 9 is an exterior plan view of the housing and radiating element of FIGURE 8.

The operation of the transducer arrangement shown in FIGURES 8 and 9 is as follows. Diaphragm 130 is sufficiently rigid to move as a unit, that is, the entire diaphragm moves inwardly and outwardly of the housing in response to longitudinal vibration of the crystal F. The minimum thickness of diaphragm 130 is determined by the fact that it must maintain its rigidity while operating at a considerable depth under water and therefore subjected to greater than atmospheric pressure. Diaphragm 130 and cylindrical member 120 are resiliently supported in a floating arrangement relative to housing wall 112, insofar as the relatively minute ultrasonic vibrations are concerned, this being accomplished by the washers 135, 136 and O ring 137.

It would appear from a theory standpoint that cylindrical member 120 constitutes a mechanical load, possibly undesirable, upon diaphragm 130. Successful results are achieved with the arrangement as shown, however.

The transducer operates at the carrier frequency of 50 kilocycles, as modified by the intelligence signal modulated thereon. Secondary modes of oscillation in completely different frequency bands are possible, but are undesirable and diminish the efficiency of the device. It is believed that the mechanical loading achieved by the cylinder 120 tends to minimize such secondary modes of oscillation.

The diameter of diaphragm 130 is about a half wave length of the carrier frequency in water. This characteristic is extremely significant and results in the diaphragm 130 operating essentially as a point source. Nevertheless a considerable directivity of the radiation is achieved, and it is believed that the directivity is due to housing wall 112 acting as a reflector or focusing element. If more than one antinode appears on the radiator, interference occurs in the water and only a weak signal can be obtained. For this reason it is believed that the maximum diameter of diaphragm 130 consistent with efficient operation is one wave length at the operating frequency.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

We claim:

1. An underwater transducer comprising a waterproof plastic housing having an outer wall in which a circular opening is formed; a metallic hollow cylindrical body occupying said opening and resiliently supported in fluid-sealing relationship therewith; an elongated isotropic crystal movably disposed within said cylindrical body and extending therethrough and inwardly of said housing, said crystal having a flat outer end and said cylindrical body having a flat circumferentially extending outer end surface portion; resilient means urging the inward end of said crystal toward said cylindrical body; a thin flat rigid metallic plate disposed transversely to the outer end of said crystal with its inner surface in bonded engagement both with said crystal outer end and said outer circumferential end surface of said cylindrical member, the outer surface of said metallic plate being exposed to the surrounding water; and electrical means within said housing for inducing longitudinal vibration of said crystal thereby to drive said plate outwardly and inwardly in vibratory motion relative to said housing wall.

2. An underwater transducer as claimed in claim 1 in which said outer housing wall is formed with first and second stepped circumferential recesses on the outer end of said circular opening, which includes an elastomeric O ring occupying the inner one of said circumferential recesses and tightly circumferentially engaging said cylindrical body, and an O ring of fibrous material occupying the outer one of said circumferential recesses, the outer circumferential edge of said metallic plate extending beyond the circumferential edge of the end surface of said cylindrical member for retaining said fibrous ring in position.

3. An underwater transducer as claimed in claim 1 in which said electrical means includes a two-terminal driving circuit of which one terminal is associated with the inward end of said crystal and the other terminal is conductively coupled to said cylindrical body.

4. An underwater transducer comprising a waterproof housing having an outer wall with an opening formed therein, a rigid hollow body occupying said opening in fluid-sealing relationship therewith and resiliently supported relative to said housing, an elongated crystal disposed within said housing and extending through said hollow body and said opening, a thin flat rigid metallic plate disposed transversely to the outer end of said crystal and bonded both to said crystal and the outer end surface of said hollow body, and means for inducing longitudinal vibration of said crystal thereby to drive said plate in vibratory motion relative to said housing wall.

5. An underwater transducer as claimed in claim 4 in which said housing outer wall has a circumferential recess formed therein, and which includes an O ring of fibrous material occupying said circumferential recess; the outer circumferential edge of said metallic plate extending beyond the circumferential edge of the outer end surface of said hollow body and engaging said fibrous ring.

6. An underwater transducer as claimed in claim 4 in which said means includes a two-terminal electrical circuit of which one terminal is associated with the inward end of said crystal and the other terminal is conductively coupled to said hollow body.

7. An underwater transducer comprising a housing having an outer wall in which a circular opening is formed; a metallic hollow cylindrical body occupying said opening and resiliently supported in fluid-sealing relationship therewith; an elongated isotropic crystal movably disposed within said cylindrical body and extending therethrough and inwardly of said housing, said crystal having a flat outer end and said cylindrical body having a flat circumferentially extending outer end surface portion; a thin flat rigid metallic plate disposed transversely to the outer end of said crystal with its inner surface in bonded engagement both with said crystal outer end and said outer circumferential end surface of said cylindrical member, the outer surface of said metallic plate being exposed to the surrounding water; and electrical means within said housing for inducing longitudinal vibration of said crystal thereby to drive said plate outwardly and inwardly in vibratory motion relative to said housing wall.

References Cited in the file of this patent

UNITED STATES PATENTS

| 2,761,117 | Green | Aug. 28, 1956 |
| 2,798,902 | Kursman et al. | July 9, 1957 |
| 2,914,686 | Clements et al. | Nov. 24, 1959 |
| 2,923,367 | Cox | Feb. 2, 1960 |
| 2,961,635 | Trott | Nov. 22, 1960 |
| 2,978,669 | Harris | Apr. 4, 1961 |
| 3,003,136 | Burnett | Oct. 3, 1961 |

OTHER REFERENCES

Military Specification, Swimmer's Underwater Telephone, MIL-C-17831A (Ships), Feb. 16, 1956.

"Comparison of Hearing Thresholds in Air and Water," The Journal of the Acoustical Society of America, vol. 30, No. 11, 1958 by Walter N. Wainwright (pp. 1025–1029 relied on).

Transistor Electronics by Dewitt and Rossoff 1957 McGraw-Hill Book Co., Inc. (pp. 232, 320 and 321 relied on).